Nov. 15, 1955  M. CHRISTOPHER  2,723,419
SAFETY DEVICE FOR AUTOMOBILE DOOR
Filed Jan. 13, 1955  2 Sheets-Sheet 1

Michael Christopher
INVENTOR.

BY *Clarence A. O'Brien*
*and Harvey B. Jacobson*
Attorneys

Nov. 15, 1955     M. CHRISTOPHER     2,723,419
SAFETY DEVICE FOR AUTOMOBILE DOOR
Filed Jan. 13, 1955     2 Sheets-Sheet 2
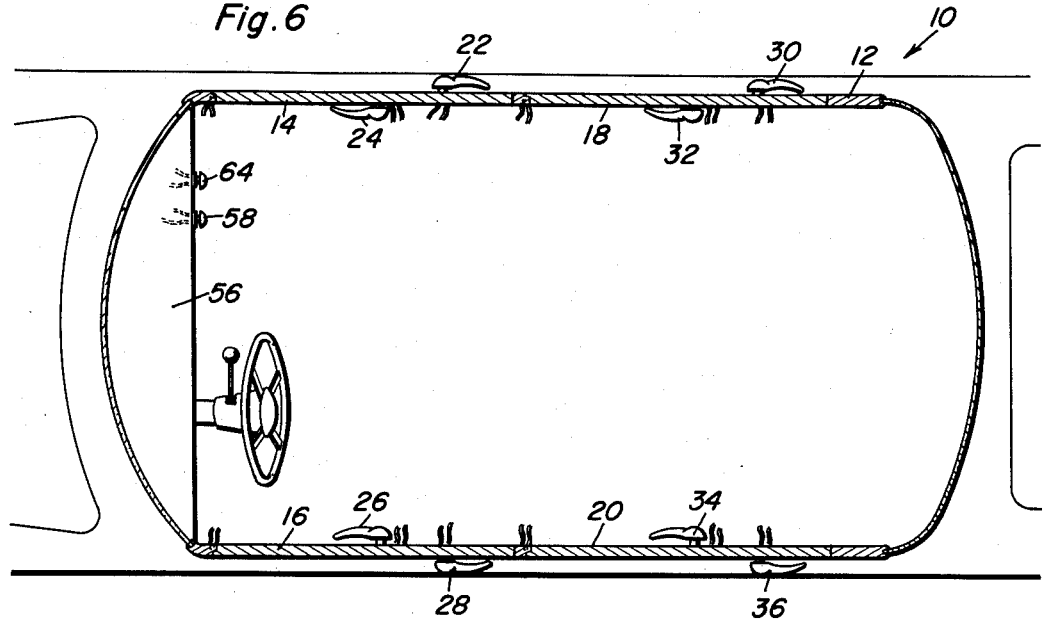
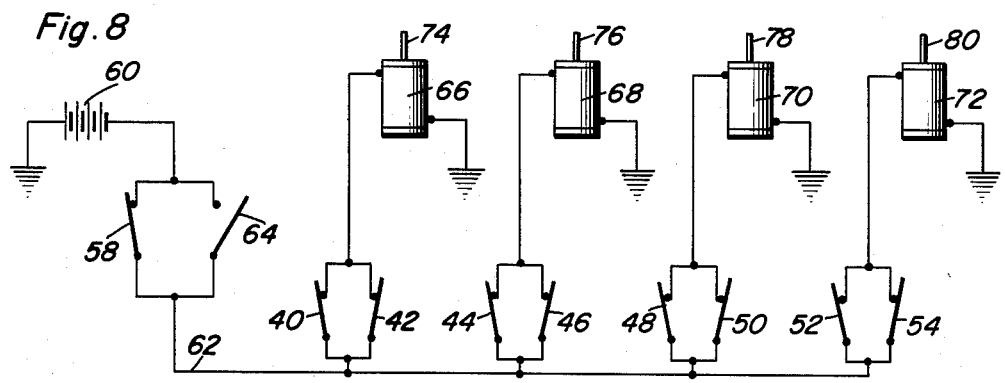
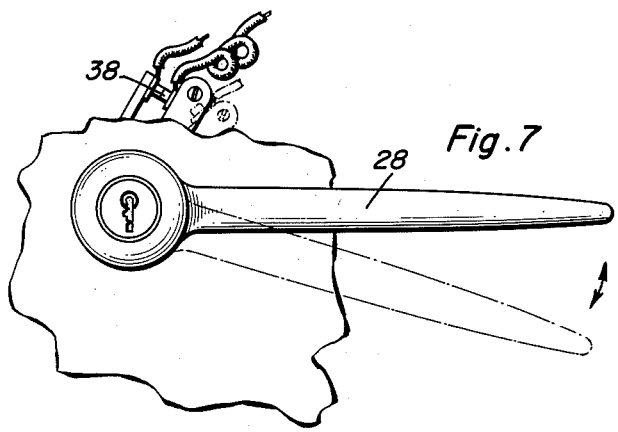
Michael Christopher
INVENTOR.

United States Patent Office 2,723,419
Patented Nov. 15, 1955

2,723,419
SAFETY DEVICE FOR AUTOMOBILE DOOR
Michael Christopher, Blair, Nebr.
Application January 13, 1955, Serial No. 481,536
4 Claims. (Cl. 16—144)

This invention relates to a safety attachment for an automotive vehicle and more particularly to a novel electrically operated door lock.

The primary object of the present invention resides in the provision of a safety mechanism for preventing the doors of a vehicle from being opened inadvertently or otherwise thereby preventing accidents which might occur should a door of a vehicle be opened while the vehicle is in motion or at other dangerous times.

Small children because of their natural curiosity are often tempted to play with the handles and knobs on doors of an automotive vehicle in which they are riding. This sometimes results in serious accidents and death or injury to the child who inadvertently opens a door while a vehicle is in motion. The present invention provides positive electrically operated means for preventing the doors from opening by engaging the hinges mounting the doors on the vehicle body in such a manner as to prevent the doors from being opened.

Still further objects and features of this invention reside in the provision of a safety attachment for an automotive vehicle that is simple in construction, easy to install and inexpensive to manufacture thereby permitting wide distribution and utilization.

These, together with the various ancillary objects and features of the invention which will become apparent as the following description proceeds, are attained by this electric safety door lock mechanism, a preferred embodiment of which has been illustrated in the accompanying drawings, by way of example only, wherein:

Figure 6 is a horizontal sectional view of a portion of the vehicle illustrating the manner in which the switches for actuating the door lock mechanism are associated with the handles of the doors;

Figure 7 is a detail view illustrating the manner in which a microswitch can be associated with a door handle; and Figure 8 is a schematic diagram of the electrical components of the invention.

Figure 1:
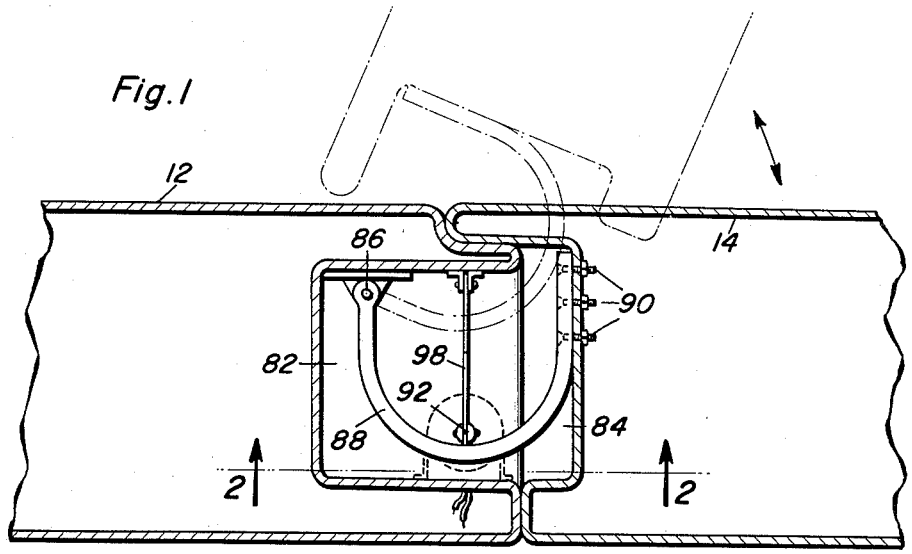
Figure 1 is a horizontal sectional view of a portion of the body of an automobile or similar vehicle and a door thereof illustrating the manner in which the present invention functions to engage the hinge mounting the door on the vehicle body and showing the door in an opened position in phantom lines.

With continuing reference to the accompanying drawings wherein like reference numerals designate similar parts throughout the various views, reference numeral 10 generally designates an automotive vehicle having a body 12 which is provided with doors as at 14, 16, 18, and 20 each of which are provided with pairs of handles 22, 24; 26, 28; 30, 32; and 34, 36. Each of the handles are of generally the same construction and as is shown in Figure 7 the handle 28 is so designed as to open and close the contacts 30 of a microswitch associated therewith. In this manner the various handles actuate pairs of microswitches 40, 42; 44, 46; 48, 50; and 52, 54.

Mounted on the instrument panel 56 of the vehicle 10 is a master switch 58 which when in a closed position completes an operative electrical circuit from a source of electric power 60 to the microswitches which are connected to conductor 62. An emergency switch 64 connected in parallel connection with the master switch 58 may be located in any other suitable portion of the vehicle or located on the instrument panel 56 and likewise completes an electric circuit from the battery 60 to the microswitches.

Connected to the microswitches are solenoids 66, 68, 70 and 72 which are grounded as in the battery 60. The solenoids 66, 68, 70 and 72 serve to actuate plungers 74, 76, 78 and 80 connected to the armatures of the solenoids.

The various plungers serve to hold the doors 14, 16, 18 and 20 of the vehicle closed and prevent the doors from being opened by engagement with the hinges mounting the doors to the body 12. As can be seen best in Figure 1, the body 12 is provided with a recess 82 therein and a complemental recess 84 is formed in the door 14. Hingedly attached to the body 12 as at 86 within the recess 82 is an arcuate hinge 88 which is rigidly attached to the door by means of bolts or other fasteners 90. The solenoid 66 is so positioned that the plunger 74 which is provided with an enlarged head 92 extends upwardly through an aperture in a suitable bearing block 93 carried by the body 12 and into engaging position with respect to the hinge 88. The plunger has a pin 94 in the upper end thereof and is bifurcated as at 96 to receive a slotted end section 97 of a bar 98 which is pivotally attached as at 100 to the body 12. Each of the plungers 74, 76, 78 and 80 are hingedly connected to the various heads 92 to prevent the solenoids from being damaged by pressure against the heads 92.

Figure 2:
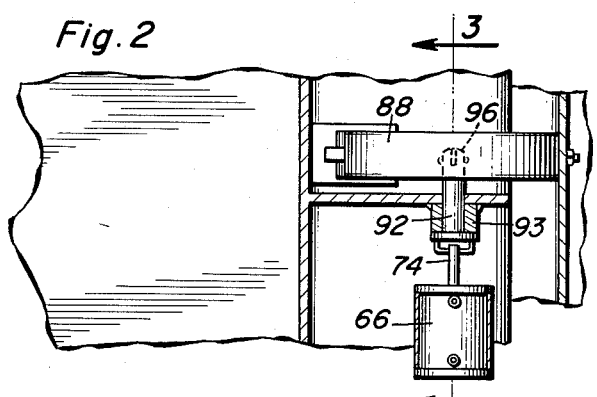
Figure 2 is a vertical sectional view as taken along the plane of line 2—2 in Figure 1 illustrating the position of the component parts of this invention when the door is in a closed position.
Figure 3:
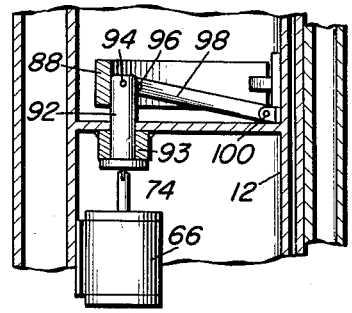
Figure 3 is a vertical sectional detailed view as taken along the plane of line 3—3 in Figure 2.
Figure 4:
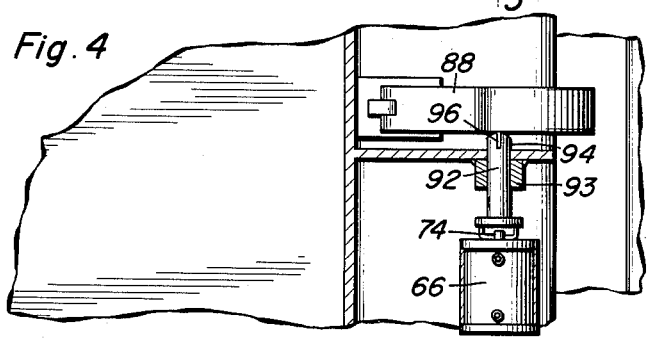
Figure 4 is a vertical sectional view similar to that of Figure 2 but illustrating the door in an open position.
Figure 5:
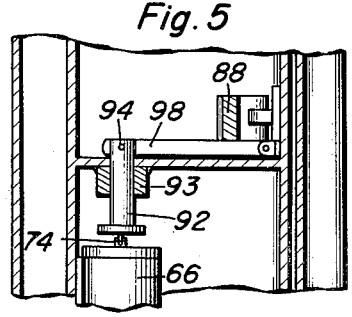
Figure 5 is a vertical sectional view similar to that of Figure 3 but illustrating the component parts of the invention when the door is in an opened position.

The operation of this device is quite simple. The switch 62 is always maintained open except in an emergency and when it is desired to keep the doors in a locked position, the switch 58 is maintained open. With the doors initially all closed, and with the switch 58 open, the plungers 74, 76, 78 and 80 are spring pressed into an extended position thereby locking all of the doors by engagement with the hinges similar to the hinge 88 with which the doors are mounted. When it is desired to permit one of the doors to be opened, the switch 58 may be closed and upon operation of one of the handles, the microswitch corresponding to the handle will be closed thereby energizing the particular solenoid and causing the retraction of the particular plunger associated with the activated solenoid. This will cause the withdrawal of the plunger from the position as is shown in Figure 2 to the position as is shown in Figure 4 and permit the hinge to override the bar 98 thus holding the plunger depressed while the door is open. As soon as the door is closed the spring will again cause the plunger to return to its extended position locking the door against further opening except when the handle is actuated thereby preventing inadvertent opening of the door. When it is desired to prevent the door from being opened, the switch 58 may be opened. Should the switch 58 fail to function properly, the switch 64 may be closed thereby permitting the individual microswitches to activate each of the solenoids.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A safety device for use in combination with a door hinge pivotally mounting a door on the body of an automotive vehicle comprising a solenoid actuated plunger engageable with said hinge for preventing movement of said door, a solenoid controlling said plunger, and switch means for activating and deactivating said solenoid, said switch means including a manual switch operated by the handle of said door and a master switch controlling flow of electrical power to said manual switch.

2. A safety device for use in combination with a door hinge pivotally mounting a door on the body of an automotive vehicle comprising a solenoid actuated plunger engageable with said hinge for preventing movement of said door, a solenoid controlling said plunger, switch means for activating and deactivating said solenoid, said switch means including a manual switch operated by the handle of said door and a master switch controlling flow of electrical power to said manual switch, and an emergency switch connected to said manual switch in parallel connection with said master switch.

3. A safety device for use in combination with a door hinge pivotally mounting a door on the body of an automotive vehicle comprising a solenoid actuated plunger engageable with said hinge for preventing movement of said door, a solenoid controlling said plunger, switch means for activating and deactivating said solenoid, a guide bar hingedly attached to said plunger, said hinge overriding said guide bar when said plunger is retracted, said guide bar being pivotally attached to said body of said automotive vehicle, said switch means including a manual switch operated by the handle of said door and a master switch controlling flow of electrical power to said manual switch.

4. A safety device for use in combination with a door hinge pivotally mounting a door on the body of an automotive vehicle comprising a solenoid actuated plunger engageable with said hinge for preventing movement of said door, a solenoid controlling said plunger, switch means for activating and deactivating said solenoid, a guide bar hingedly attached to said plunger, said hinge overriding said guide bar when said plunger is retracted, said guide bar being pivotally attached to said body of said automotive vehicle, said switch means including a manual switch operated by the handle of said door and a master switch controlling flow of electrical power to said manual switch, and an emergency switch connected to said manual switch in parallel connection with said master switch.

References Cited in the file of this patent

UNITED STATES PATENTS

| | | |
|---|---|---|
| 232,128 | Huguet | Sept. 14, 1880 |
| 872,650 | Gilroy | Dec. 3, 1907 |
| 2,323,150 | McMillan | June 29, 1943 |